UNITED STATES PATENT OFFICE

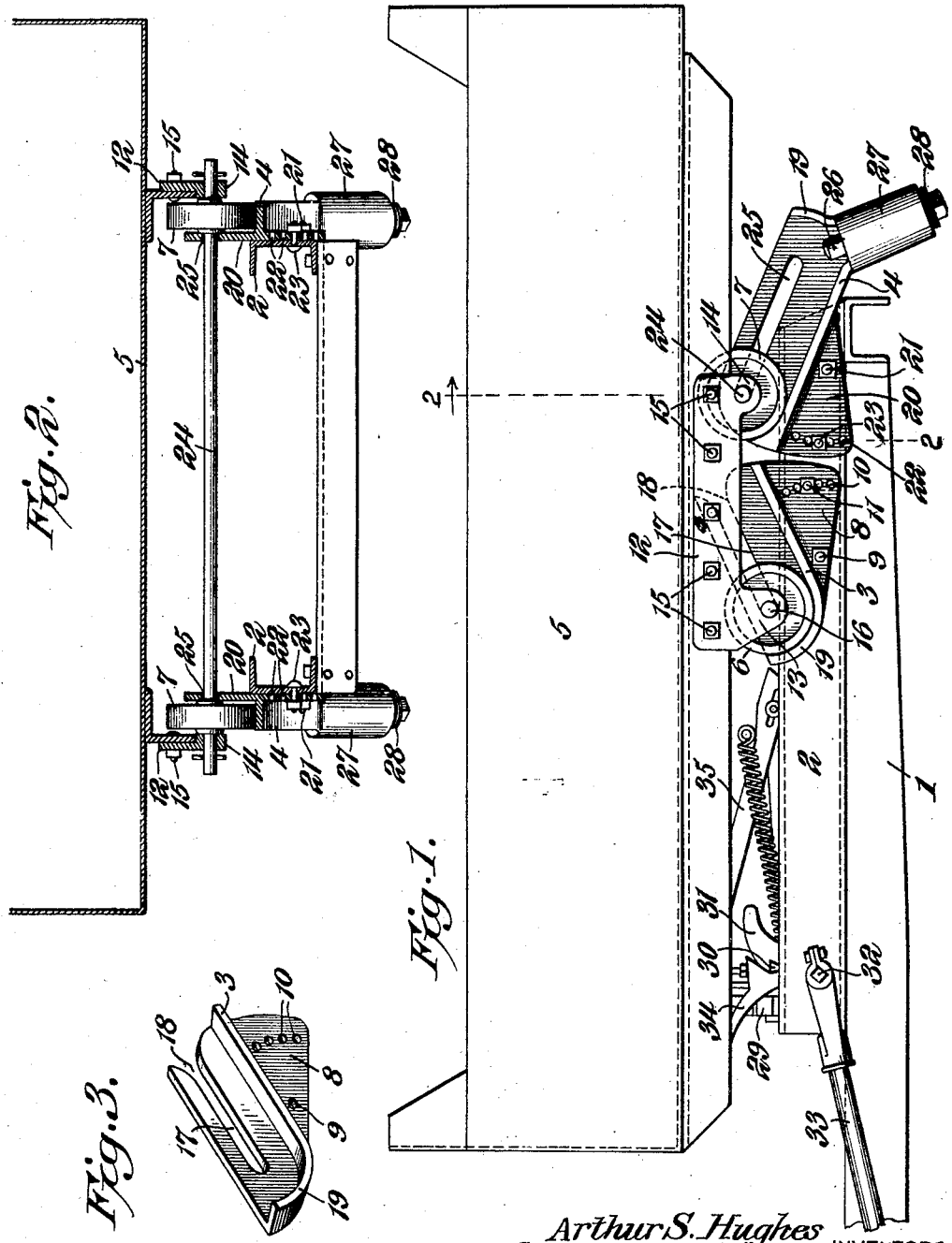

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

DUMPING TRUCK

Application filed November 10, 1927. Serial No. 232,385.

This invention relates to dumping trucks and, among other objects, aims to provide an improved mounting for dump bodies including tracks or runways of adjustable inclination which are carried by the chassis of the truck and which receive rollers secured to the body to support the latter and permit tilting for dumping.

The present application is a companion to three other applications recently filed by us, Serial Numbers 215,714, 218,034 and 226,146.

In the accompanying drawings showing a preferred embodiment of the invention:—

Fig. 1 is a side elevation of the rear portion of a truck chassis having the improved runways mounted thereon, and showing a dump body co-operating therewith;

Fig. 2 is a vertical transverse section taken on the line 2—2 of Fig. 1;

Fig. 3 is a detail perspective view of one of the adjustable tracks or runways.

As fully brought out in certain pending applications, it is desirable to employ a relatively low dump body in order to facilitate loading by hand labor, and because of the low sides of the body it becomes necessary to lengthen said body so that a sufficient load may be carried to render use of the truck economical. Such a body is shown in the drawings, together with means for causing the automatic tilting and dumping of the body, to discharge the load therein, when certain latching and releasing means have been manually operated to permit the same, as more fully brought out in our pending application Serial No. 218,034.

As disclosed in said companion applications, when the body is in normal carrying position, its weight is supported upon wheels or rollers mounted in pairs at either side of the body and bearing upon oppositely-disposed inclined tracks or runways secured in position upon the truck. The location of the rollers relative to the length of the body and the inclination thereof, must be such as to permit the loaded body, when the latter is released, to move bodily, under the weight of the load, towards the rear, far enough to clear the end of the truck chassis and wheels, and at the same time to automatically tilt into full dumping position. It is also desirable, as disclosed in said applications, that the body be automatically locked in dumping position, and, after the load is dumped, that the empty body, upon being released, return automatically to the normal loading and carrying position.

Referring particularly to the drawings, there is shown the rear portion 1 of a conventional truck chassis having mounted thereon, for the purpose of mounting the dump body, a sub-frame 2 which may consist of a rectangular structure formed of suitable channels and including side members arranged longitudinally of the chassis and adapted to be secured to the latter in any desired manner. Located at the rear portion of said sub-frame and adjustably secured to the outer faces of said side members, are pairs of front and rear runways 3 and 4 respectively. The front pair of runways, which are of right and left formation, consist of tracks arranged at an inclination, the rear ends being higher than their front ends and somewhat higher than the upper face of the sub-frame 2. The rear pair of runways, which are also of right and left formation, consist of similar tracks the rear ends of which, however, are lower than their front ends and extend somewhat beyond the rear end of the sub-frame, while their front ends are substantially on a level with the upper face of the sub-frame.

Located above the tracks or runways and over the sub-frame is an automatically-dumping body 5 having the hereinbefore mentioned characteristics, the front end of said body, when in normal or load-carrying position, extending slightly in advance of the front end of the sub-frame, while the rear end of the body extends considerably beyond the rear end of the sub-frame. The body is equipped at its sides and substantially midway between its front and rear ends, with wheels or rollers 6 constituting a pair of front rollers, which are spaced a sufficient distance from the lower frame of the body to rest upon the lowest portion of the inclined front runways 3, to elevate the body above the sub-frame, when the body is in normal position. In like manner, a pair of rear wheels or rollers 7 are carried by the body in a position to rest normally upon the elevated front ends of the rear runways.

The front runways are each provided with a perpendicularly-disposed base plate 8 extending above and below the track or runway and preferably formed integrally therewith, the said lower portion constituting an attaching plate of triangular formation and having a perforation adjacent its front end, and near the lowest portion of the runway, for the reception of a pivot bolt 9. The rear portion of the attaching plate, which is wider than the front portion thereof, by reason of the angular relation of the track or runway therewith, is provided with a series of equally-spaced holes 10, formed on an arc having the pivot perforation as a center and adapted to receive, in the selected hole, a fastening bolt 11 passing through the side of the sub-frame 2, to hold the runway in whatever position gives the desired results.

In order to secure the wheels or rollers in the above described positions relative to the body and for properly seating upon the runways, an elongated bracket 12 is employed on either side of the body, said brackets each having front, depending ears 13 and rear, depending ears 14, and being also provided with a longitudinal series of holes for the reception of fastening bolts 15 which rigidly secure the brackets to the body. The front ears act as bearings for the ends of an axle 16 upon which the front rollers are mounted, said axle freely passing through inclined slots 17 formed in the upper portions of the base plates 8, above and parallel with the front tracks or runways 3. The upper ends of the slots 17 are open to the rear to permit the axle to pass entirely therefrom, when the body is in full dumping position, and the edges 18 are rounded to facilitate the re-entrance of the axle when the body automatically returns to its normal position after discharge of its load.

The front, lower ends of the front runways are each provided with an upwardly curved extension 19 to fit around the rollers and act as stops to arrest the forward movement of the body when returning to normal position and properly to position the body for automatic locking or latching to hold the body while being loaded or while in transit, as disclosed in application, Serial No. 218,034.

When the body is in normal position, with the front rollers located at the lowest portion of the front runways and abutting the stops 19 thereof, the rear rollers are located at the upper, forward ends of the rear runways and abut against stops formed at the upper ends of the runways 4 and which aid in bringing the body to a halt in its forward movement, after automatically returning subsequent to the dumping operation. In the dumping movement of the body the rear wheels abut the aforesaid stops 19 located at the rear, lower ends of the rear runways, which positively check the movement of the body in this direction.

The rear rollers are mounted on a rear axle 24 having its ends journalled in the rear, depending ears or lugs 14, said axle traversing inclined slots 25 formed in the upstanding portions of the base plates 20 and being arranged parallel to the tracks 4. The ends of the rear slots 25 are closed and freely permit the axle to move therein from normal to dumping positions and return and serve to hold the rear rollers on their respective tracks or runways at all times, while the front slots 17 similarly hold the front rollers to their tracks but permit the front axle to emerge therefrom when the tilting body partakes of its final dumping movement and rocks about the rear axle as an axis with the rollers 7 abutting the rear stops 19. At this time, the jar of the impact caused by the descending body and load is taken up by a spring pressed plunger 26 mounted in a socket 27 forming part of the rear runways, there being means, such as a screw plug 28 provided to adjust the springs (not shown) for properly receiving the shock.

When the empty body is released to return to its normal position, by means to be later referred to, the superior weight of the front end of the body, which is then elevated at an angle, causes the same to rapidly rock forward, the front rollers moving down the tracks 3 and the rear rollers moving up the tracks 4, until the body assumes a normal, horizontal position and the shock is taken up by an abutment 29 located at the front end of the body and sub-frame and which serves to center the body on the frame and to protect the latter from damage by such shock.

The dumping body is preferably adapted to be automatically held in loading or carrying position by means of a keeper 30 carried by the body and which automatically engages a spring pressed dog 31 at about the time the weight of the empty body automatically returns the same to normal position. The dog 31 is mounted on a transverse operating shaft 32 under the control of a handle 33 which may, in turn, be operated to release the dog 31 and simultaneously operate a curved arm or "kicker" 34 which acts to impart an initial impetus to the body to start the dumping movement. When in full dumping position, with the emptying body resting upon the aforesaid plungers 26, said body is held in such position, to fully discharge the load, by means of a lever arrangement 35 which comprises hinged members known as a "stiff leg," and which may also be actuated to release the body for return to normal position. These parts, however, are disclosed more fully in pending applications, and no further description will be made herein, nor claim made thereto.

It will be clear that by adjusting the angularity of the two sets of tracks or runways, dump bodies of different dimensions and shapes may be taken care of by the same mounting and the dumping thereof may be made automatic (by means of the load) or non-automatic, as desired. Furthermore, if the parts work hard or uncertainly, the dumping action may be made more certain or rapid by properly adjusting the runways.

Obviously the present invention is not restricted to the particular embodiment thereof herein shown and described.

What is claimed is:—

1. A dumping truck comprising, in combination, a frame; and a body mounted above the frame; front and rear inclined runways mounted on the frame; means for adjusting the inclination of the runways individually relative to the frame and for holding them in adjusted positions; and rollers carried by the body and mounted to traverse the runways to support the body and permit tilting.

2. A dumping truck comprising, in combination, a frame; and a body mounted above the frame; front and rear pairs of oppositely-inclined runways mounted on the sides of the frame; means for separately adjusting the inclination of the runways and for holding them in adjusted positions; and rollers carried by the body and adapted to roll up and down the runways to tilt the body.

3. A dumping truck comprising, in combination, a frame; and a body mounted above and in spaced relation to the same; a front pair of runways secured to the frame and having their rear ends higher than their front ends; a rear pair of runways secured to the sides of the frame and having their rear ends lower than their front ends; means for adjusting the angularity of the rear runways; and rollers journalled on the body and mounted on the runways to support the body and allow the body to move in the direction of discharge in dumping its load.

4. A dumping truck comprising, in combination, a frame adapted to be secured to the chassis of the truck; and a dump body located over the frame; front rollers carried by the body and located substantially midway between the front and rear ends thereof, said rollers normally extending below the upper face of the frame; rear rollers carried by the body and located substantially midway between the front rollers and the rear end of the frame, said rollers being normally higher than the front rollers; separate oppositely-disposed, inclined runways mounted on each side of the frame in position to receive the rollers and support the body; means for preventing the rollers from rising from the runways when the body is in normal position; and means for separately adjusting the degree of angle of each runway.

5. A dumping truck comprising, in combination, a frame; and a dump body located over the frame; spaced pairs of front and rear rollers carried by and below the body, the front rollers being normally below the rear rollers; a separate inclined runway to receive each roller and secured in pairs to opposite sides of the frame, the front pair of runways inclining rearwardly and the rear pair of runways inclining forwardly; means for separately adjusting each runway; stops carried by the runways to check the body at each limit of its movement; means for locking the body in normal position and for releasing the same to permit automatic dumping; and releasable means for automatically holding the body in dumping position.

6. A dumping truck comprising, in combination, a frame; and a dump body mounted above the frame; spaced pairs of front and rear rollers carried by the body and mounted on axles; side brackets secured to the body, and having depending journals for the ends of the axles, the front journals depending a greater distance than the rear journals; a separate, inclined runway mounted on the side of the frame and adapted to support each wheel, the front runways being disposed to cause the front rollers to elevate the front end of the body and the rear runways being disposed to cause the rear rollers to lower the rear end of the body, during dumping; and means for separately adjusting the runways to vary the inclination thereof.

7. A dumping truck comprising, in combination, a frame; a dump body mounted above the frame; spaced pairs of front and rear rollers carried by the body and mounted on axles; side brackets secured to the body and having depending journals for the ends of the axles, the front journals depending a greater distance than the rear journals; separate, oppositely-inclined runways mounted on the sides of the frame in position to support the wheels, each runway comprising a straight track; a base plate connected in perpendicular relation to the inner edge of the track and extending above and below the same; an intermediate pivot bolt connecting the plate to the frame below the track, the plate below the track having an arcuate series of spaced holes arranged concentrically to the pivot; and a removable bolt traversing one of said holes and the side of the frame to permit adjustment of the runway.

In testimony, that we claim the foregoing as our own, we have hereto affixed our signatures.

ARTHUR S. HUGHES.
HOWARD F. GORSUCH.